United States Patent [19]

Fields

[11] Patent Number: 5,403,678
[45] Date of Patent: Apr. 4, 1995

[54] CORROSION-RESISTANT AND PROTECTIVE TERMINAL STRUCTURE FOR A BATTERY POST

[76] Inventor: Kevin B. Fields, 35 High St., Montclair, N.J. 07042

[21] Appl. No.: 152,056

[22] Filed: Nov. 16, 1993

[51] Int. Cl.[6] ............................................. H01M 2/32
[52] U.S. Cl. ...................................... 429/65; 429/121; 439/522
[58] Field of Search .............. 439/65, 121, 178, 522, 439/202, 892, 894, 754

[56] References Cited

U.S. PATENT DOCUMENTS

| | | | |
|---|---|---|---|
| 1,622,550 | 3/1927 | Towle | 429/65 |
| 1,714,467 | 5/1929 | Dunn | 429/65 X |
| 1,833,395 | 11/1931 | Ford | 429/65 |
| 2,629,222 | 12/1952 | Wirth | 429/65 X |
| 5,338,898 | 8/1994 | Luciano et al. | 429/65 X |

Primary Examiner—Anthony Skapars
Attorney, Agent, or Firm—Ezra Sutton

[57] ABSTRACT

The present invention is directed to a protective terminal structure for a battery post which includes a protective cap member, an upstanding stud member for receiving a battery cable connector, and a locking nut for fastening the battery cable connector to the stud member. In addition, it includes a grease fitting with passageways for providing grease or lubricant to the battery post within the protective cap member. The cap member is preferably formed of tellurium copper and is color coded to indicate a positive or negative battery post.

11 Claims, 6 Drawing Sheets

CORROSION-RESISTANT AND PROTECTIVE TERMINAL STRUCTURE FOR A BATTERY POST

FIELD OF THE INVENTION

The present invention relates to a terminal structure for a battery post which is corrosion-resistant and protects the battery post in order to increase battery life and available power and reduce costly maintenance.

BACKGROUND OF THE INVENTION

It is well known that battery posts are subject to corrosion which, over a period of time, reduces the life of the battery and available power and increases maintenance costs. Presently, there is no simple and inexpensive way of allowing a non-technical person to protect the terminal structure of the battery posts of their car and/or truck.

Accordingly, it is an object of the present invention to provide a simple and inexpensive protective terminal structure for a battery post, which increases the battery life and available power of the battery, as well as substantially reduces maintenance costs and minimizes or eliminates corrosion of the battery post.

SUMMARY OF THE INVENTION

In accordance with the principles of the present invention, there is provided a corrosion-resistant and protective terminal structure for a battery post, which includes a protective cap member having a hollow internal cavity for receiving and completely enclosing the battery post, with the cap member having means for electrically engaging the battery post and for holding the protective cap member onto the battery post. The protective cap member further includes an upstanding stud member for receiving the battery cable connector for making electrical connection between the battery cable connector and the protective cap member. In addition, a color-coded fastening nut is provided to fasten the battery cable connector to the upstanding stud member.

In the preferred embodiment, the protective cap member and the upstanding stud member are formed of tellurium copper to enhance the electrical conductivity between the battery post and the battery cable connector.

Also, in accordance with a preferred embodiment of the invention, the upstanding stud member is provided with a grease fitting, so that grease may be supplied through the grease fitting to the internal cavity of the protective cap member for supplying grease to the battery post for substantially eliminating or minimizing corrosion of the battery post.

In addition, in accordance with the principles of the present invention, a protective cap member is also provided for a battery terminal on the sidewall of a battery.

Accordingly, the present invention provides a simple and inexpensive protective terminal structure for a battery post which substantially reduces maintenance of the battery and which substantially eliminates or minimizes corrosion and which increases the battery life, as well as increasing the available power of the battery during its life time.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein.

DETAILED DESCRIPTION OF THE PREFERRED EMBODIMENTS

Figure 1:
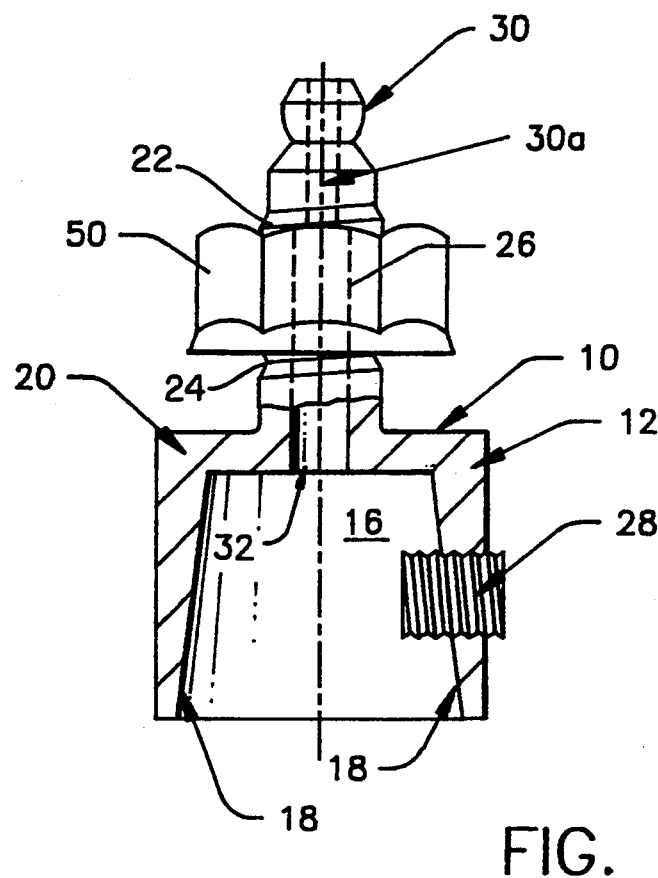
FIG. 1 shows a partially cross-sectional view of the protective terminal structure for a battery post.
Figure 2:
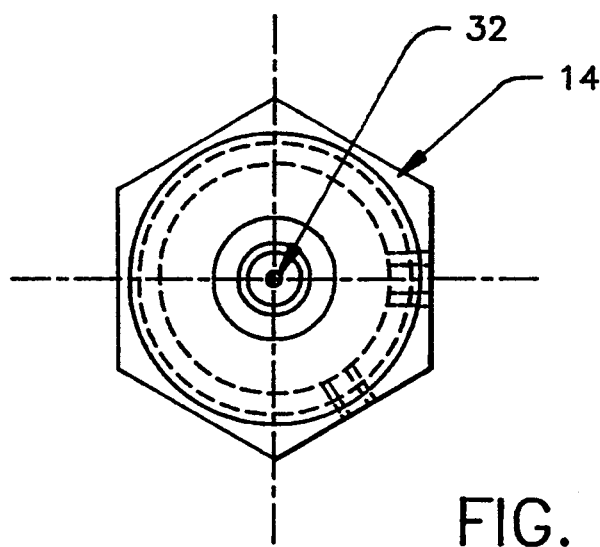
FIG. 2 is a cross-section view thereof.
Figure 3:
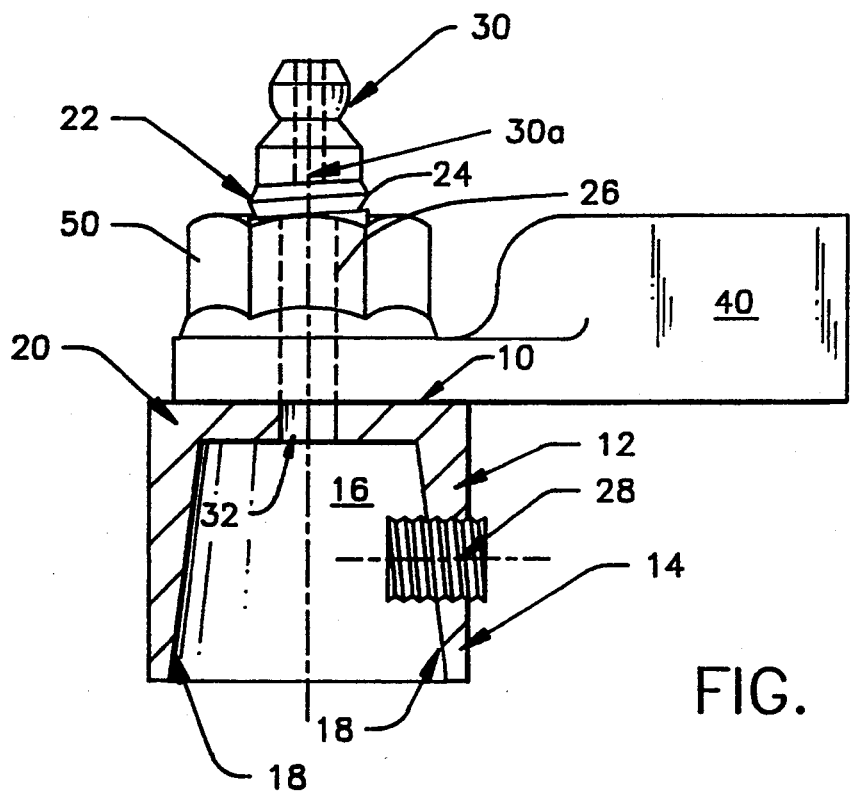
FIGS. 3 and 4 are cross-sectional views of the embodiment shown in FIG. 1.
Figure 4:
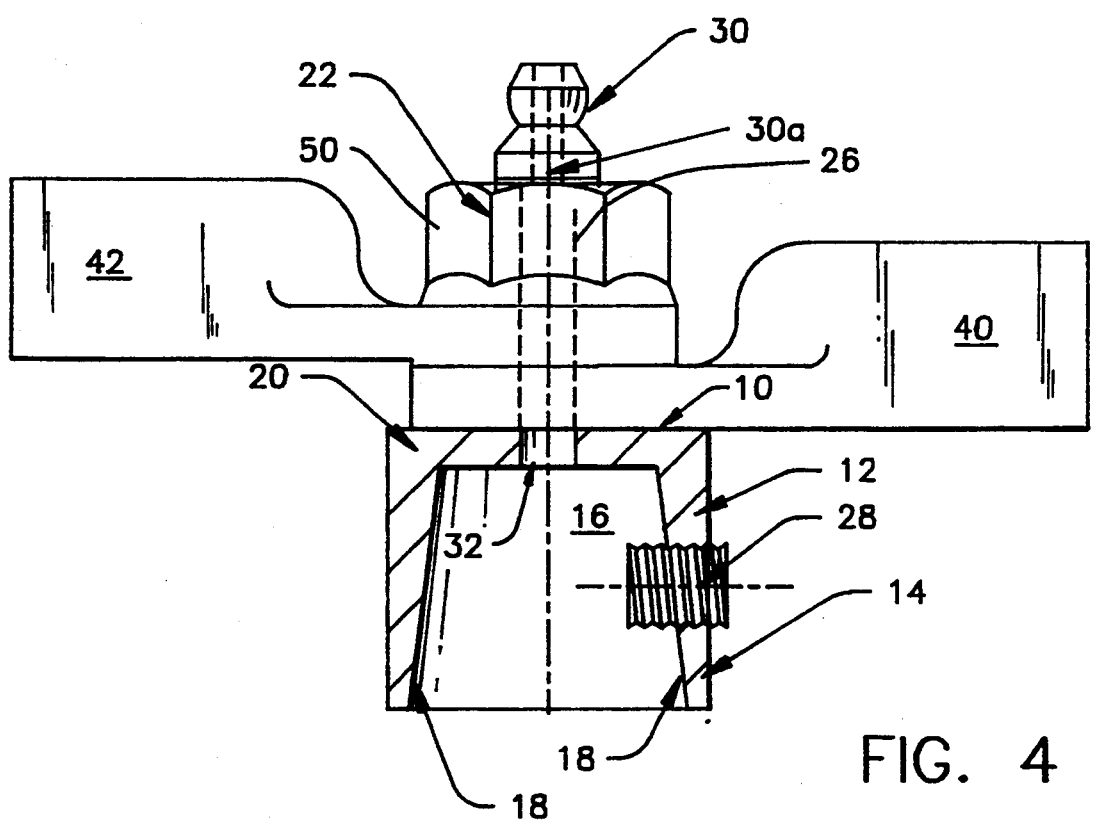
Figure 5:
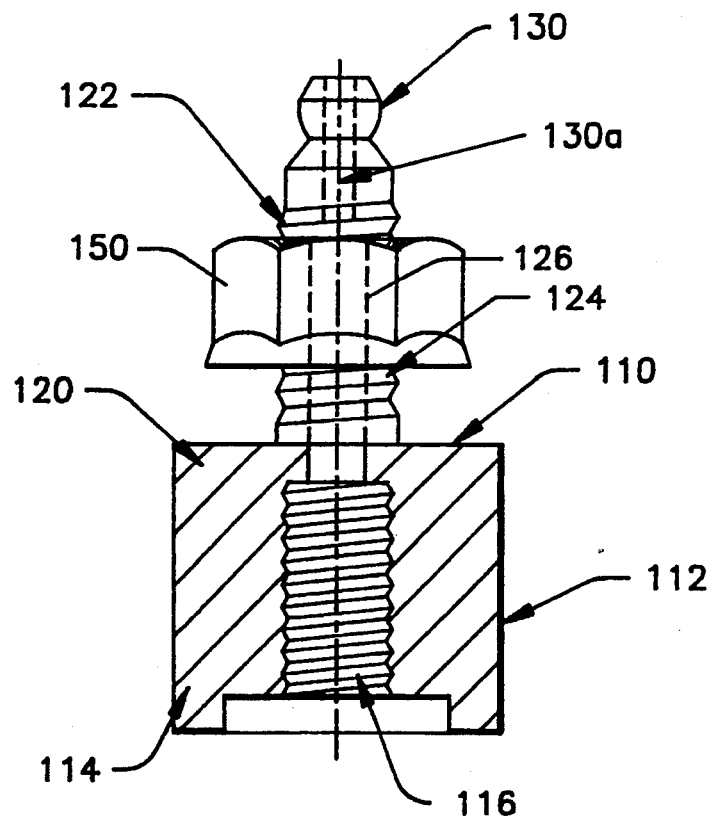
FIG. 5 shows a partially cross-sectional view of an alternative embodiment of the present invention.
Figure 6:
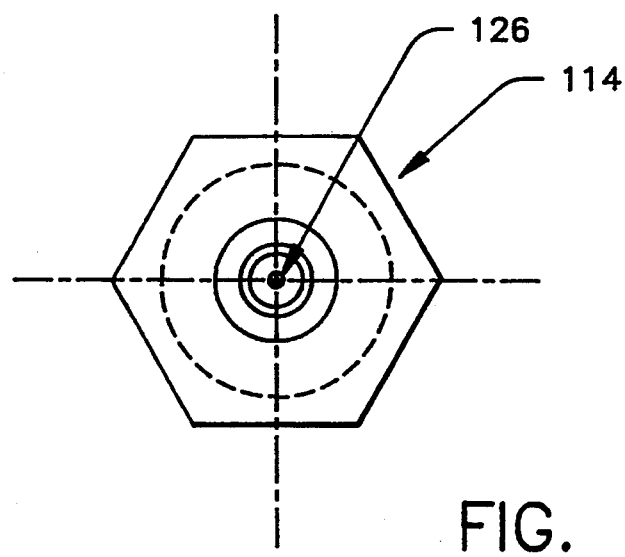
FIG. 6 is a cross-sectional view thereof.
Figure 7:
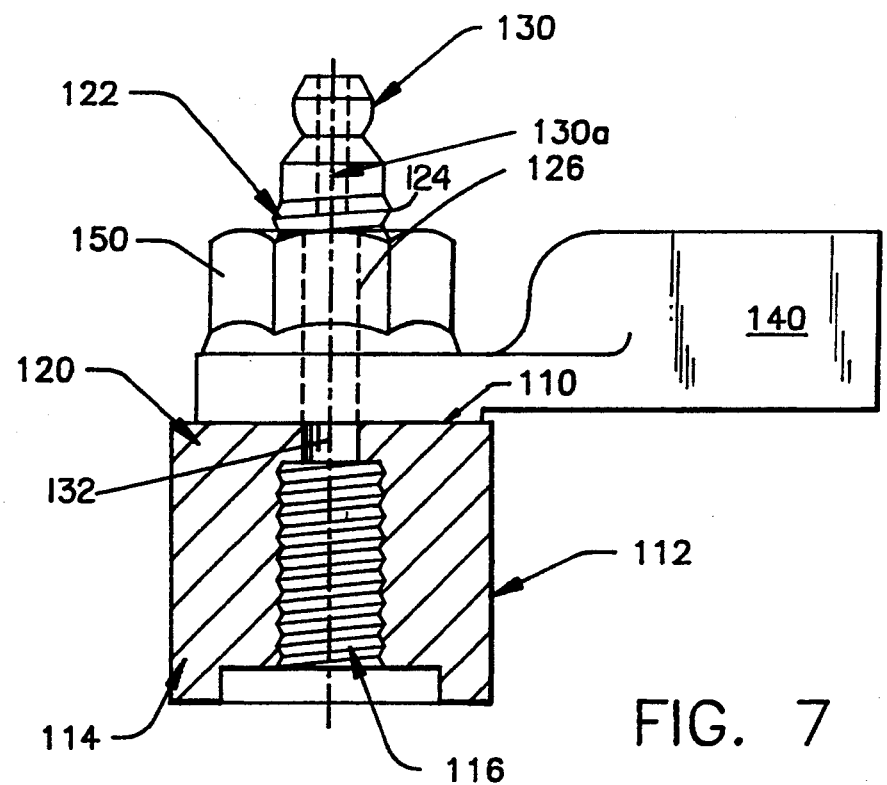
FIGS. 7 and 8 are cross-sectional views of the embodiment shown in FIG. 5.

Referring to FIGS. 1 to 4, there is shown the corrosion-resistant and protective terminal structure 10 of the present invention for use on a battery post. The terminal structure 10 includes a protective cap member 12 having the configuration of an inverted cup having a circular wall 14 and a hollow internal cavity 16 for receiving and completely enclosing a battery post. The cap member 12 has internal walls 18, which are tapered approximately 4 degrees to match the tapering of the battery post and which closely engage the battery post for making electrical connection therewith and which hold cap member 12 onto the battery post. The cap member 12 includes an upper horizontal wall member 20 and an upstanding stud member 22 mounted on the upper wall member 20 for receiving a battery cable connector 40 for making electrical connection between cap member 12 and the battery cable connector. The stud member 22 includes threads 24 for fastening battery cable connector 40 to the upstanding stud member 22. The fastening threads 24 are color coded red to indicate a positive battery post and black to indicate a negative battery post.

Upstanding stud member 22 has an internal passageway 26 and a grease fitting 30 mounted thereon. Grease fitting 30 has an internal passageway 30a connected to internal passageway 26, which is 1/16" in diameter. The upper wall member 20 of cap member 12 also has an internal passageway 32 connected to internal passageway 26. In this manner, a grease gun is connected to grease fitting 30 to apply grease or lubricant through passageway 30a of grease fitting 30 and through internal passageways 26 and 32 to the internal cavity 16 for supplying grease to the battery post received therein for substantially eliminating corrosion of the battery post. Grease fitting 30 allows any space that surrounds the battery post to be filled with grease. Once the lubricant is installed, it prevents water, moisture, air, and acid from coming into contact with the battery posts.

The protective cap member 12 and the upstanding stud member 22 are formed of tellurium copper to enhance the electrical conductivity between the battery post and the battery cable connector.

Protective cap member 12 includes two threaded holes each for receiving a set screw 28. For greater locking power, the threaded holes and the two set screws are spaced apart 60 degrees from each other, rather than the traditional 120 degree placement of 3 set screws. When the spacing is 60 degrees, the force of each set screw working in the specified tolerances of the terminal will apply a force greater than the 120 degree spacing of 3 set screws. Preferably, Allen screws are used to insure proper tightening, and they use the smallest amount of space. The positioning of the set screws has the further advantage of simplifying the set screws locking procedure, rather than having to rotate the terminal to alternately tighten the set screws. This type of application saves installation time and assures proper assembly. The set screws engage the battery post for making electrical connection therewith and for holding cap member 12 onto the battery post.

A flange nut or locking nut 50 that holds cable connector 40 in place is a ⅜"-16th flange nut. It is made from a light alloy that is self-locking to insure a secure fit, is zinc plated, and is color coordinated in red-positive, black-negative with a special primer and paint that has superior corrosion resistance. As sown in FIG. 4, stud member 22 has a sufficient height to receive two cable connectors 40 and 42.

It should be understood that since the positive and negative battery posts differ in size slightly, the terminal structure 10 is made in 2 sizes to fit the different sizes of the positive and negative battery posts.

Referring to FIGS. 5 to 8, there is shown another embodiment of the corrosion-resistant and protective terminal structure 110 of the present invention for use on a battery post. The terminal structure 110 includes a protective cap member 112 having surrounding walls 114 and a hollow internal screw-threaded cavity 116 for receiving a screw-type battery post. Screw-threaded cavity 116 engages the battery post for making the electrical connection therewith and holds cap member 112 onto the battery post.

The cap member 112 includes an upper horizontal wall member 120 and an upstanding stud member 122 mounted on the upper wall member 120 for receiving a battery cable connector 140 for making electrical connection between cap member 112 and the battery cable connector. The stud member 122 includes threads 124 for fastening battery cable connector 140 to the upstanding stud member 122. The fastening threads 124 are color coded red to indicate a positive battery post and black to indicate a negative battery post.

Upstanding stud member 122 has an internal passageway 126 and a grease fitting 130 mounted thereon. Grease fitting 130 has an internal passageway 130a connected to internal passageway 126, which is 1/16" in diameter. The upper wall member 120 of cap member 112 also has an internal passageway 132 connected to internal passageway 126. In this manner, a grease gun is connected to grease fitting 130 to apply grease or lubricant through passageway 130a of grease fitting 130 and through internal passageways 126 and 132 to the internal threaded cavity 116 for supplying grease to the battery post received therein for substantially eliminating corrosion of the battery post.

The protective cap member 112 and the upstanding stud member 122 are formed of tellurium copper to enhance the electrical conductivity between the battery post and the battery cable connector.

Figure 8:
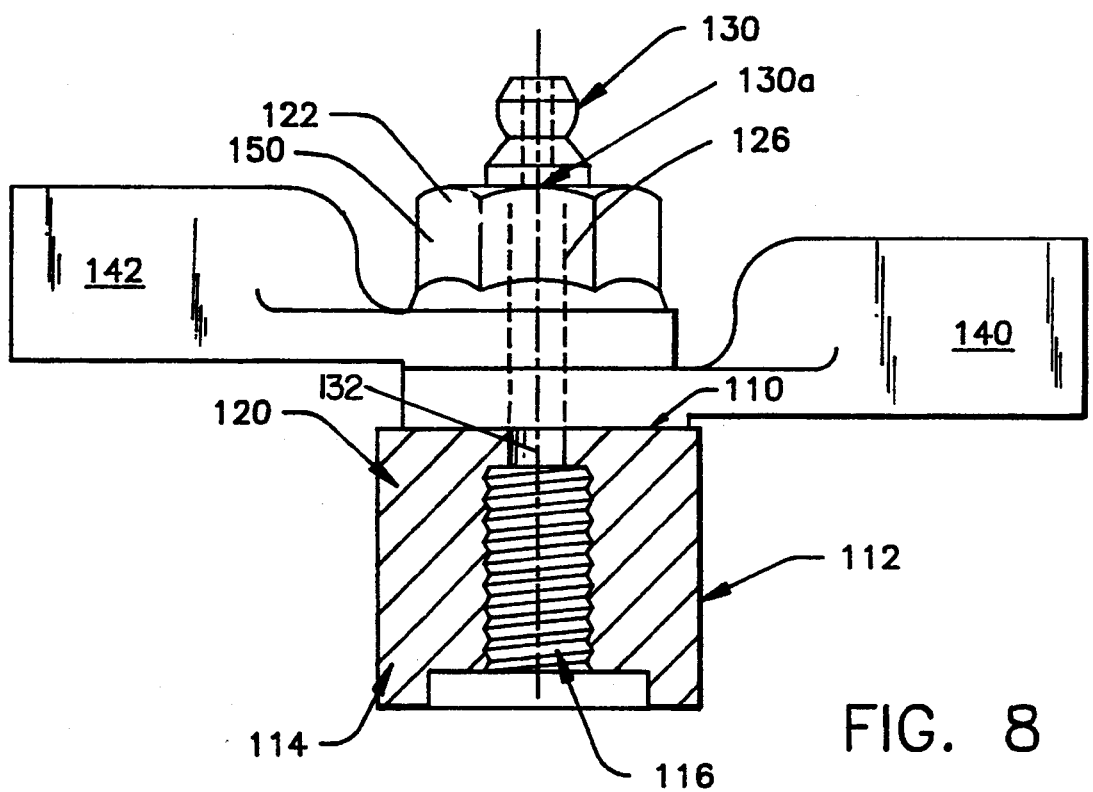
Figure 9:
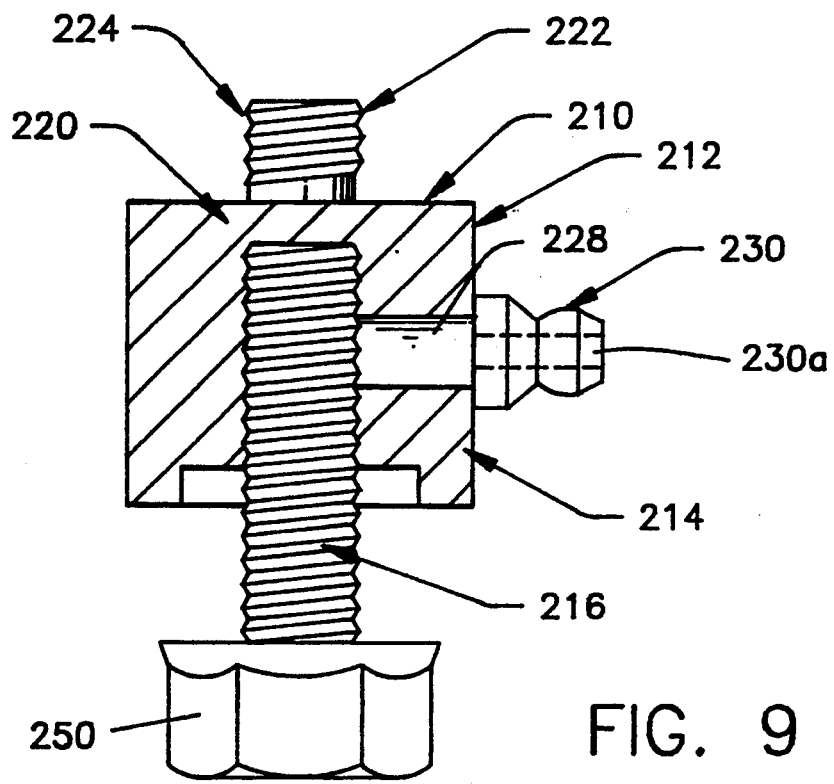
FIG. 9 shows a partially cross-sectional view of a third embodiment of the present invention.
Figure 10:
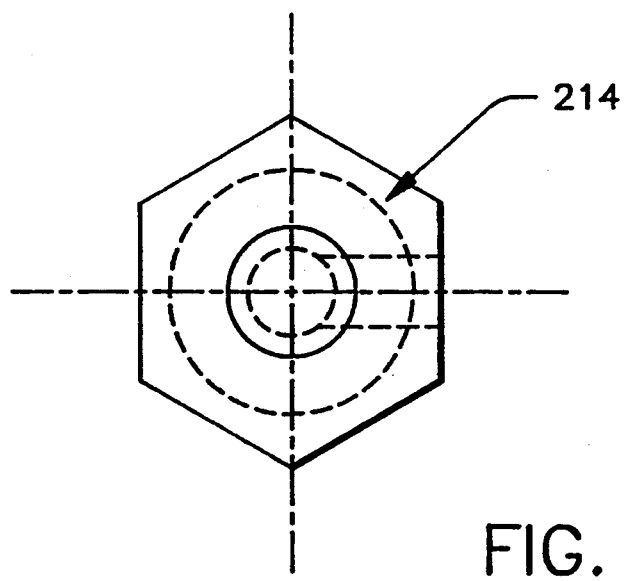
FIG. 10 is a cross-sectional view thereof.
Figure 11:
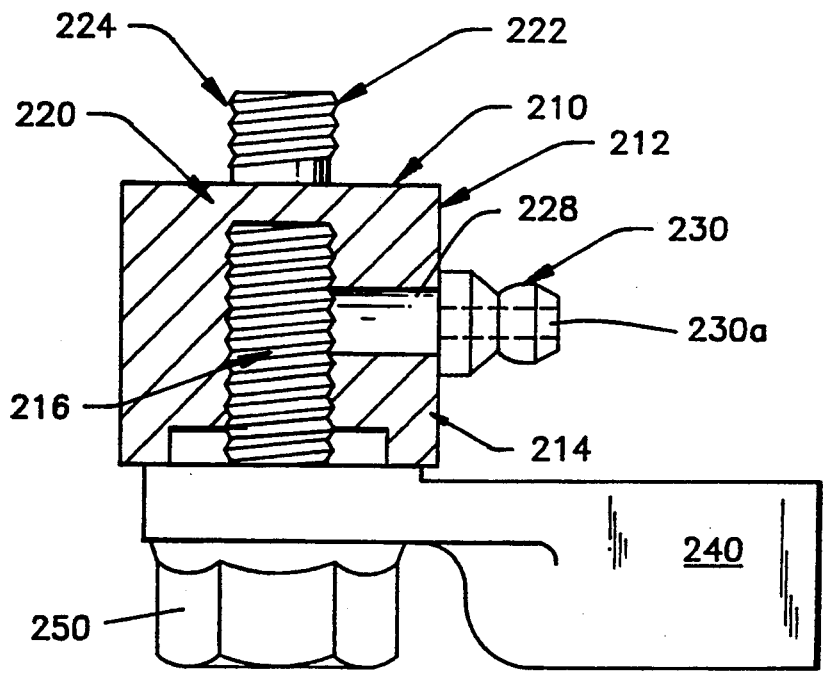
FIGS. 11 and 12 are cross-sectional views of the embodiment shown in FIG. 9.

A flange nut or locking nut 150 that holds cable connector 140 in place is a ⅜"-16th flange nut. It is made from a light alloy that is self-locking to insure a secure fit, is zinc plated, and is color coordinated in red-positive, black-negative with a special primer and paint that has superior corrosion resistance. As shown in FIG. 8, stud member 122 has a sufficient height to receive two cable connectors 140 and 142.

Referring to FIGS. 9 to 12, there is shown still another embodiment of the corrosion-resistant and protective terminal structure 210 of the present invention for use on a battery having a side terminal with a screw-threaded opening for receiving the terminal structure. The terminal structure 210 includes a protective cap member 212 having surrounding walls 214, and a hollow internal screw-threaded cavity for receiving a threaded stud 216 for receiving a battery cable connector 240 for making the electrical connection between cap member 212 and the battery cable connector.

The cap member 212 includes a horizontal wall member 220 and an upstanding stud member 222 mounted on the wall member 220. The stud member 222 includes threads 224 for fastening the stud member 222 to the side terminal of the battery. The fastening threads 224 are color coded red to indicate a positive battery post and black to indicate a negative battery post.

The protective cap member 212 and the upstanding stud member 222 are formed of tellurium copper to enhance the electrical conductivity between the battery and the battery cable connector.

Figure 12:
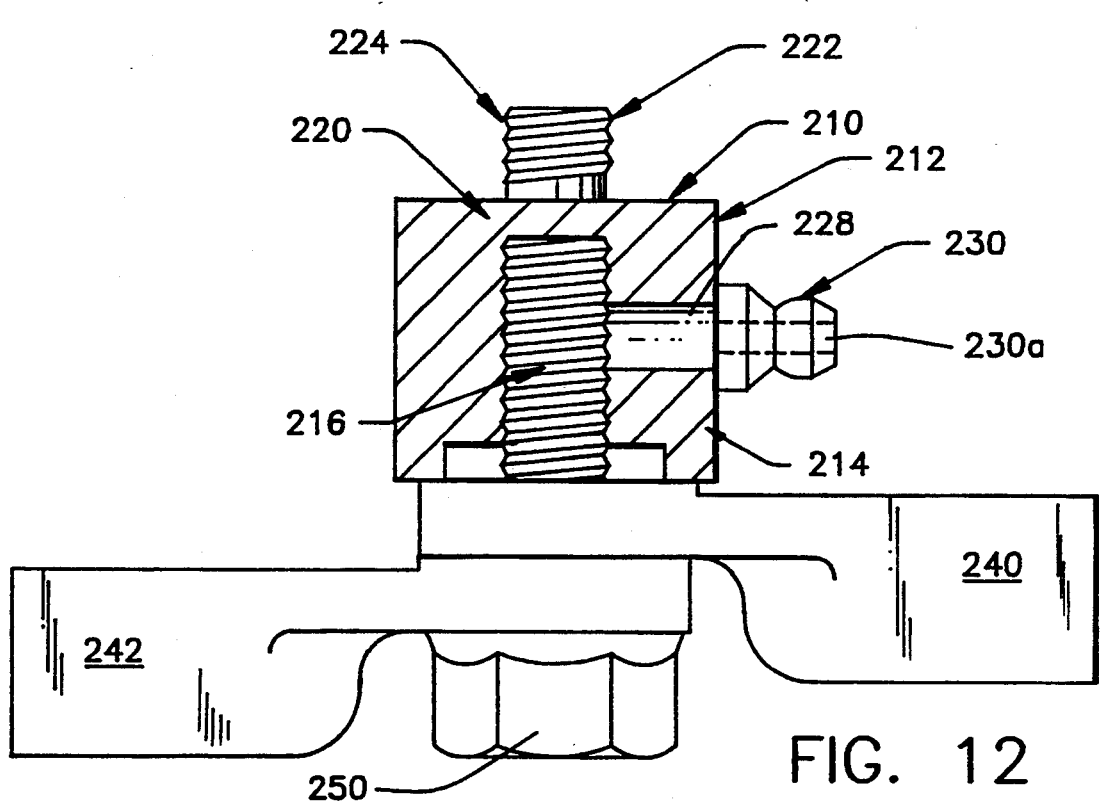

A flange nut 250 that holds cable connector 240 in place is a ⅜"-16th flange nut. It is made from a light alloy that is self-locking to insure a secure fit, is zinc plated, and is color coordinated in red-positive, black-negative with a special primer and paint that has superior corrosion resistance. As shown in FIG. 12, stud member 216 has a sufficient height to receive two cable connectors 240 and 242.

Cap member 212 includes a passageway 228 for receiving a grease fitting 230 which has an internal passageway 230a connected to passageway 228. In this manner, grease is supplied through passageways 228 and 230a to the internal cavity which receives threaded stud 216. This substantially eliminates corrosion.

Terminal structures 10, 110, and 210 include a protective coating of zinc to protect against corrosion and to seal the terminals against water, oil, and corrosive gases.

Tellurium copper, known in the trade as Copper Nos. C14500, C14510, and C14520, is employed in the present invention because of its high conductivity of electricity, corrosive resistance, and its peak performance for complex electrical systems. The improved connection and higher conductivity provide more cranking power and more cranking amps to the solenoid and starter motor. This means quicker starts and less wear on the starter. The present invention provides maximum power with minimal voltage drops, which allows the entire electrical system to function as designed. The performance of the lights, radios, C.B.s, and auxiliary equipment is enhanced. Also, confidence is restored to gauge readings and computer system operation. In addition, the tellurium copper has 1/25th the resistance that lead terminals have. With the present invention, the average voltage drop is less than 1 millivolt. The S.A.E. standard J163 allows a maximum voltage drop of 25 millivolts.

The present invention allows the battery a higher reserve cycle capacity. The result is less battery fatigue, which provides the potential for 50% longer battery life. In addition, recharging is 50% faster. The higher conductivity of the tellurium copper terminal structure and the elimination of corrosive oxides provides faster power flow back into the battery to replenish the power source.

Although tellurium copper is preferred, other metals or alloys may be employed which have high conductivity, such as lead, silver, copper, all copper alloys, cast copper, aluminum, and mild steel.

Advantageously, the terminal structure of the present invention reduces maintenance costs by extending battery replacement intervals and costly maintenance man hours, and increases the reliability in any system that requires batteries. Further, the electrical conductivity of the terminal structure of the present invention is seven (7) times greater than the old style lead "C" clamps. The higher conductivity means that the battery does not have to work as hard when providing starting power to any engine. As a result, the battery needs less recharging and recharges faster, and the battery, the starter, the alternator, and the rest of the electrical system have less work to do. Therefore, these parts will last longer. Both down time and replacement cost are significantly reduced. Thus, the present invention increases the reliability of any system that requires batteries.

Advantageously, the present invention has application to all types of vehicles, including cars, trucks, tractors, RVs, and boats, to equipment used in the construction industry, on farms and in industry, and to all battery-operated equipment. It reduces the replacement of starters, battery cables, alternators, and batteries; it reduces electrical problems and the need for emergency road service; it reduces static on cellular phones, stereos and C.B. radios; it reduces the chance of accidental sparks during removal or installation of a battery; it reduces battery post breakage caused when loosening old terminals; it reduces installation and removal time for storage, replacement or theft protection; and it reduces the need for battery tools, such as clamps, spreaders, and pullers.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A corrosion-resistant and protective terminal structure for a battery post, comprising:
    (a) a protective cap member having the configuration of an inverted cup and a hollow internal cavity for receiving and completely enclosing the battery post;
    (b) said cap member having means for engaging the battery post for making electrical connection therewith and for holding said cap member onto the battery post;
    (c) said cap member having an upper wall member and an upstanding stud member mounted on said upper wall member for receiving a battery cable connector for making electrical connection between said cap member and the battery cable connector;
    (d) means for fastening the battery cable connector to said upstanding stud member;
    (e) said upstanding stud member having a first internal passageway;
    (f) a grease fitting mounted on said upstanding stud member and having a second internal passageway connected to said first internal passageway;
    (g) the upper wall member of said cap member having a third internal passageway connected to said first and second internal passageways, whereby grease may be supplied through said grease fitting and into said first, second, and third internal passageways to said hollow internal cavity for supplying grease to the battery post received therein for substantially eliminating corrosion of the battery post;
    (h) said protective cap member and said upstanding stud member being formed of copper to enhance the electrical conductivity between the battery post and the battery cable connector; and
    (i) a portion of said terminal structure being color coded to indicate a positive or negative battery post.

2. A terminal structure in accordance with claim 1, wherein said hollow internal cavity has tapered walls to match the tapering of the battery post and to provide direct surface contact between said cap member and the battery post.

3. A terminal structure in accordance with claim 1, wherein said cap member and said upstanding stud member are formed of tellurium copper and are color coded.

4. A terminal structure in accordance with claim 1, wherein said protective cap member includes at least one threaded hole, and said means for engaging the battery post includes a set screw for threading into said threaded hole.

5. A terminal structure in accordance with claim 1, wherein said fastening means is a locking nut for holding the cable connector in place on said stud member and is color coded.

6. A corrosion-resistant and protective terminal structure for a battery post, comprising:
    (a) a protective cap member having a hollow internal cavity for receiving and completely enclosing the battery post;
    (b) said cap member having means for electrically engaging the battery post and for holding said cap member onto the battery post;
    (c) said cap member having an upper wall member and an upstanding stud member mounted on said upper wall member for receiving a battery cable connector for making electrical connection between said cap member and the battery cable connector;
    (d) means for fastening the battery cable connector to said upstanding stud member; and
    (e) said protective cap member and said upstanding stud member being formed of copper to enhance the electrical conductivity between the battery post and the battery cable connector.

7. A terminal structure in accordance with claim 6, wherein said fastening means is color coded to indicate a positive or negative battery post.

8. A terminal structure in accordance with claim 6, wherein said cap member and said upstanding stud member are formed of tellurium copper.

9. A corrosion-resistant and protective terminal structure for a battery terminal on the sidewall of a battery, comprising:
    (a) a protective cap member having a hollow internal cavity for receiving fastening means;
    (b) said cap member having a wall member and an upstanding stud member mounted on said wall member for insertion into the battery terminal for making electrical connection between said cap member and the battery terminal;

(c) means for fastening a battery cable connector to said cap member, said fastening means being received within said hollow internal cavity; and (d) said protective cap member and said upstanding stud member being formed of copper to enhance the electrical conductivity between the battery terminal and the battery cable connector.

10. A terminal structure in accordance with claim 9, wherein said cap member and said upstanding stud member are formed of tellurium copper.

11. A terminal structure in accordance with claim 9, wherein said fastening means is a locking nut and a threaded stud for insertion into said hollow cavity.

* * * * *